United States Patent Office 2,876,261
Patented Mar. 3, 1959

2,876,261

ALPHA-DI-CHLOROACETAMIDO-BETA - CHLORO-p-NITROPROPIOPHENONE AND METHOD OF PRODUCTION

Robert Michel Jacob, Ablon-sur-Seine, France, assignor to Parke, Davis & Company, Detroit, Mich., a corporation of Michigan No Drawing. Application September 15, 1955
Serial No. 534,597

4 Claims. (Cl. 260—562)

This invention relates to new substituted propanols and to processes for their preparation. This application is a continuation-in-part of application Serial No. 212,482, filed February 23, 1951, now Patent No. 2,727,070, dated December 13, 1955.

It is an object of the present invention to provide new substituted propanols which are of value as intermediates for the production of therapeutically important substances as will be more particularly described hereinafter. A further object is to provide novel and commercially useful processes for the preparation of these propanols.

The substituted propanols of the present invention conform to the conventional formula:

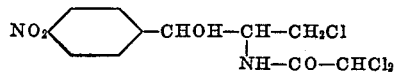

This formula includes two structurally different forms, the term "structurally" referring to the spatial relationship of the polar groups respectively attached to the two asymmetric carbon atoms. By analogy with the nomenclature adopted by Rebstock et al. (J. A. C. S., vol. 71., pp. 2458–2473) in connection with the diastereoisomeric amido-diol, 2-dichloracetamido-1-p-nitrophenylpropane 1:3-diol, an isomer of which is known by the common name chloramphenicol, the structural isomeric forms are herein referred to as "erythro" and "threo" respectively. Both the erythro and the threo forms can exist as racemates of optically active isomer giving a total of six different forms. The foregoing structural formula of conventional type includes, therefore, the complete mixture of all six forms, the racemates of the erythro and threo series and the four individual isomers L-erythro, D-erythro, L-threo and D-threo. It should be noted that the configurational representation of the isomers as D and L bears no relation to the actual sign of the rotation but refers to the configuration about the alpha carbon atom. The D-threo compound has the same configuration with respect to the alpha carbon atom as the therapeutically active isomer of chloramphenicol which has been designated D(—)-threo 2-dichloracetamido-1-p-nitrophenylpropane 1:3-diol.

According to a feature of this invention, the new compounds are prepared by reducing an α-dichloracetamido-β-chloro-p-nitropropiophenone of the formula:

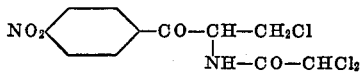

by the Meerwein method using an oxidizable aluminum alkoxide, preferably an aluminum alkoxide derived from an aliphatic secondary alcohol such as aluminum isopropoxide and under anhydrous conditions employing an inert organic solvent, conveniently a lower aliphatic alcohol corresponding to the alkyl radical contained in the alkoxide. The yield obtained in this process consists predominately of the DL-, D- or L-erythro forms respectively according to whether the propiophenone has the dl-, l- or d-form.

The above mentioned propiophenones are themselves prepared by treating with thionyl chloride, a compound of the type disclosed in U. S. Patent 2,515,239 having the formula:

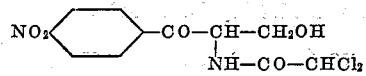

The new compounds of the present invention, particularly the DL- and L-erythro and DL- and D-threo forms, constitute valuable intermediates for the preparation of chloramphenicol and the DL mixtures of which it is the D-component. This can be accomplished by cyclicizing the 2-dichloracetamido-1-p-nitrophenyl-3-chloropropane-1-ol with dilute sodium hydroxide at room temperature to obtain a 2-dichloromethyl-4-p-nitrophenylhydroxymethyl-Δ²-oxazoline as described in copending application Serial No. 212,481, filed February 23, 1951, now Patent 2,702,804. The said oxazoline can be dissolved in dilute hydrochloric acid at a temperature of 50° C. or below followed by neutralization with aqueous ammonia in the cold to obtain a 2-dichloracetamido-1-p-nitrophenylpropane-1,3-diol as described in the application of Ronald Slack, Serial No. 424,280, filed April 19, 1954, as a continuation-in-part of Serial No. 199,937 filed December 8, 1950, now abandoned.

The present invention is illustrated by the following non-limitative examples:

Example 1

50 g. of α-dichloracetamido-β-hydroxy-p-nitropropiophenone and 65 cc. of thionyl chloride are heated under reflux for 2 hours. The mixture is left to crystallize in the cold, filtered, washed with anhydrous ether and the product dried in vacuo over caustic potash. 42.7 g. of dl-α-dichloracetamido-β-chloro-p - nitropropiophenone are obtained, melting at 137–140° C.

In a Meerwein reduction apparatus, such as is described in "Organic Reactions," vol. II, p. 197, are heated 10.5 g. of dl-α-dichloracetamido-β-chloro-p - nitropropiophenone, 16 g. of aluminum isopropylate and 250 cc. of anhydrous isopropyl alcohol. 135 cc. of a mixture of acetone and isopropyl alcohol containing 1.6 g. of acetone are distilled off. After cooling, the contents of the flask are taken up with 90 cc. of 2 N sulphuric acid. 400 cc. of water are then added and a product is precipitated which is filtered off and dried in the air. This is extracted with ethyl acetate and by the addition of petroleum ether 5.6 g. of a crude product are precipitated, which, after recrystallization from aqueous ethyl alcohol, melts at 133–134° C. and which is DL-erythro 2-dichloracetamido-1-p-nitrophenyl-3-chloropropane 1-ol.

Example 2

A fine suspension of 340 g. of dl-α-dichloracetamido-β-chloro-p-nitropropiophenone in 1.5 litres of anhydrous isopropyl alcohol is run during 2 hours into a boiling solution of 612 g. of aluminum isopropylate in 3 litres of isopropyl alcohol, a mixture of isopropyl alcohol and acetone distilling rapidly off. (Volume distilled=4 litres.) The residual red mass is poured onto crushed ice and acidified with dilute sulphuric acid until just acid to Congo red. The precipitate obtained is filtered off, washed with water and dried in the air, to give 278 g. of crude DL-erythro 2-dichloracetamido-1-nitrophenyl-3-chloropropane 1-ol of M. P. 127° C.

Example 3

Following the method of the preceding example but with a suspension of 2 g. of levorotatory α-dichloracetamido-β-chloro-p-nitropropiophenone, M. P. 100–106° C. (α) 22=—13.3° (c.=4% in ethyl acetate) in $_D{}^{25}$ cc. of isopropyl alcohol, and adding the suspension during 1 hour to 3.6 g. of aluminum isopropylate in 30 cc. of boiling isopropyl alcohol, there are obtained 1.45 g. of crude D-erythro 2-dichloracetamido-1-p-nitrophenyl-3-chloropropane 1-ol, M. P. 74–78° C. After recrystallization from boiling methanol the product has the following characteristics: M. P.=101° C. ($\alpha$) $D^{25}$=+12.5° (c.=4% in methanol).

I claim:
1. A compound having the formula:

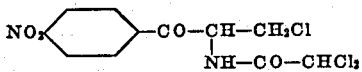

2. dl-α-Dichloracetamido - β - chloro - p - nitropropiophenone.
3. Process which comprises mixing a compound having the formula:

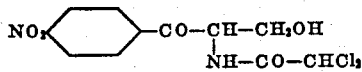

with thionyl chloride and heating under reflux temperature thereby obtaining a compound having the formula:

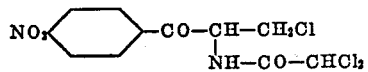

4. 1-α-dichloracetamido - β - chloro - p - nitropropiophenone.

References Cited in the file of this patent
UNITED STATES PATENTS

| | | |
|---|---|---|
| 2,513,346 | Moersch et al. | July 4, 1950 |
| 2,514,376 | Crooks et al. | July 11, 1950 |
| 2,515,239 | Long | July 18, 1950 |
| 2,515,241 | Long | July 18, 1950 |
| 2,663,727 | Gaillot et al. | Dec. 22, 1953 |
| 2,727,070 | Jacob | Dec. 13, 1955 |

OTHER REFERENCES

Long et al.: J. Am. Chem. Soc., vol. 71, July 1949, pages 2473–75.